Dec. 15, 1970   C. A. SANDOVAL   3,548,352
ACTUATING DEVICE

Filed Aug. 6, 1969   2 Sheets-Sheet 1

INVENTOR.
Charles A. Sandoval
BY
Attorney

INVENTOR.
Charles A. Sandoval
BY
Attorney

United States Patent Office 3,548,352
Patented Dec. 15, 1970

3,548,352
ACTUATING DEVICE
Charles A. Sandoval, Albuquerque, N. Mex., assignor to the United States of America as represented by the United States Atomic Energy Commission
Filed Aug. 6, 1969, Ser. No. 847,869
Int. Cl. H01h 7/14
U.S. Cl. 335—265                                      11 Claims

ABSTRACT OF THE DISCLOSURE

An actuating device having a plurality of independently counter-rotatable rotors movable from first to second positions such that as the rotors are moved from the first to the second positions, an operating or working member is freed to move to activate a switch or to perform some other desired function.

BACKGROUND OF INVENTION

Commonly in areas of limited accesibility, shifting mechanisms are frequently used to move a particular operating or working member from one position to another upon command from a remote location to perform such functions as opening or closing a switch, opening or closing a light path, or the like. The operating member may, for example, be a part of a solenoid, its movement effected by the forces of the magnetic field of the solenoid. Since it is often desirable that such shifting mechanisms be reliably operable over a wide range of extreme environments including accelerations, decelerations, torques, moments, and forces, as may be encountered, for example, in aircraft, space vehicles, and other rugged applications, provisions may be required to lock the operating mechanism members or elements to prevent them from prematurely activating due to their own inertias under the influence of the external forces. Frequently, this locking requirement is accomplished by using a second member which, instead of the operating member, may be a part of a solenoid. This second member holds the working elements until the solenoid is activated to move the second member and therebyl free the operating member. For example, in U.S. Pat. 3,421,125 issued to the applicant herein and assigned to the assignee of the instant application, a device having a rotatble operating member held in position by at least one linearly movable locking bar is disclosed. Upon application of electrical power to a coil about the locking bar, a magnetic field is generated moving the locking bar and allowing the rotatable operating member to pivot to activate a switch or perform some other appropriate function.

In addition to the desirability that the shifting mechanism have its working members locked until a release signal is applied, it may also be desirable that only one such command signal be required to cause it to operate so that when the solenoid is activated the device automatically unlocks and performs its function without further external signals or instructions.

Another class of actuating devices is that including inertial sensing devices and switches. Such devices are commonly used to sense accelerations and decelerations in many applications, such as in aircraft, missiles, rockets, weapons, and the like. Inertial sensing devices commonly utilize a mass with a particular bias applied to it which is overcome by the force of the mass resisting the acceleration to which the device may be subjected. By appropriate choice of bias force, the mass can be made to respond only to a predetermined minimum acceleration. Thus, for example, if a switch is to be closed as an aircraft reaches or exceeds a particular known critical acceleration, the sensing mass may be biased such that the critical acceleration creates a force opposing the bias of sufficient magntiude to move the mass the distance required to close the switch, but any lesser acceleration will create an insufficient force to move it that distance.

Often, when such inertial sensing devices are used in weapon applications, a safing mechanism may be required to hold the inertial mass until the weapon is to be operated to prevent permature detonation if the weapon is subjected to vibrations and acceleration before it is to be used. This is often accomplished in a similar manner to that described above with respect to devices which move a member from a first to a second position, utilizing a second member which is a part of a solenoid to lock the inertial mass until the solenoid is activated to move the locking member, release inertial mass, and arm the weapon.

SUMMARY OF INVENTION

It is therefore an object of the invention to present an actuating device which has at least one locked position unaffected by externally applied decelerations, rotations, vibrations or other influences or combinations thereof.

It is a further object of the invention to present an actuating device which has at least two rotational locking members or rotors which rotate in opposite directions to release an operating member to perform a desired function.

It is a further object of the invention to provide an actuating device which may be used as a shifting mechanism.

It is a still further object of the invention to provide a shifting mechanism which both unlocks and actuates an operating member to perform a desired function upon application of a single command signal.

It is a further object of the invention to provide an actuating device which may be used as an inertial sensing device.

It is a yet further object of the invention to provide an inertial sensing device which includes a safing mechanism unaffected by vibrations, accelerations, rotations, or other externally applied influences.

These and other objects, features, and advantages will become apparent from the following description when read in conjunction with the attached drawing and appended claims.

In accordance with the invention, an actuating device is presented in which two members or rotors having parellel axes of rotation and being operable independently of one another are shown counter-rotatably mounted on a supporting body. The rotors normally assume a first position in which the device is locked, and no movements of an operating member are allowed.

When the members are rotated simultaneously in opposite directions, such as by a means for generating a magnetic field about and within them the device is unlocked allowing the operating member to move to perform some desired function. When used as a shifting mechanism, to assure that when the device is unlocked the operating member will perform its desired function, means for biasing it are additionally provided to urge it in the direction of a switch or other actuable means.

Alternatively, if the device of the invention is used as an inertial sensing device, the means for biasing the operating member are disposed so as to oppose the force of the operating member in resisting accelerations in a particular direction.

BRIEF DESCRIPTION OF DRAWING

The invention is illustrated in the accompanying drawing, wherein.

EMBODIMENT

Figure 1:
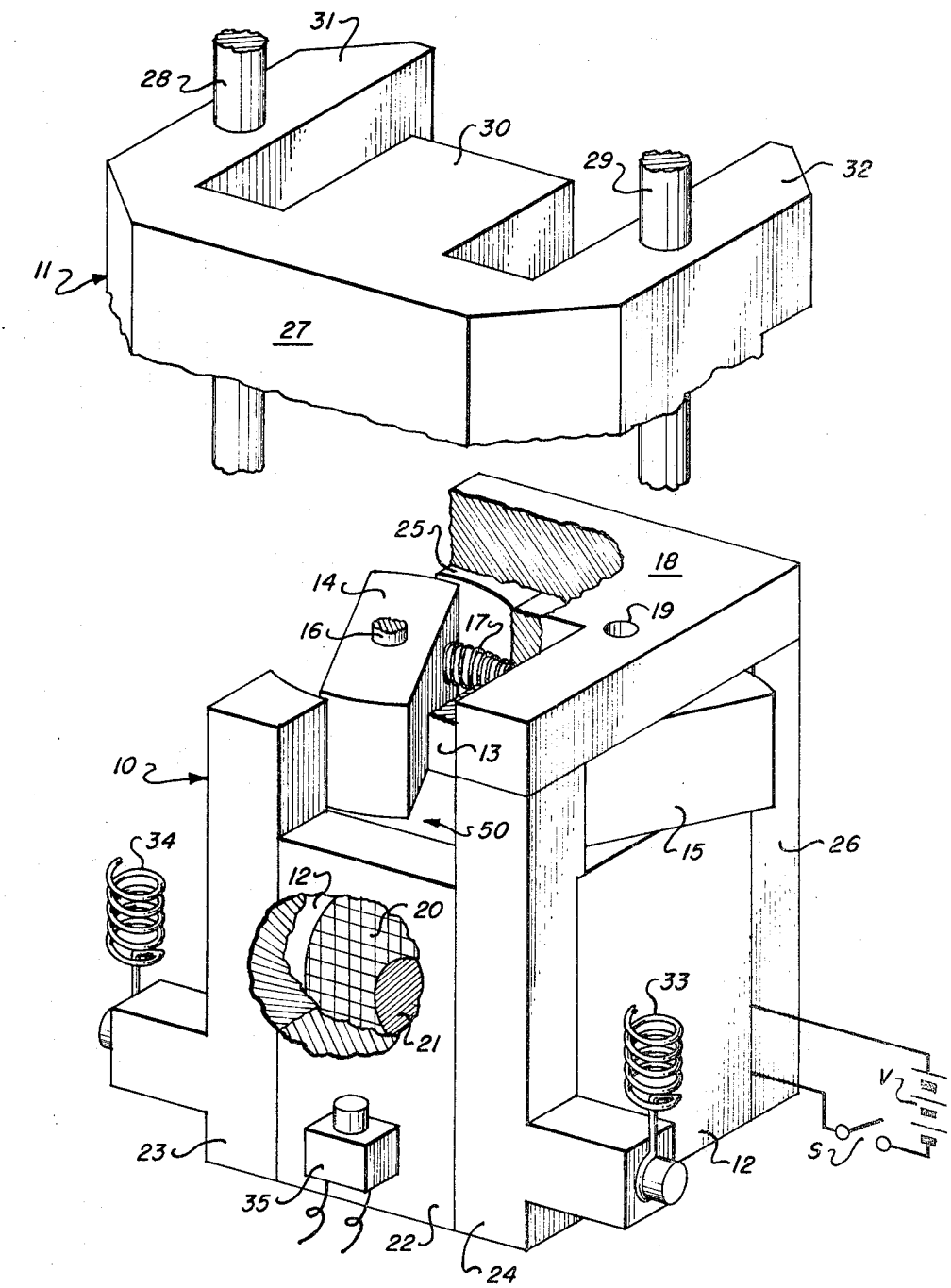
FIG. 1 is an exploded perspective view of a preferred embodiment of the invention with portions partially cut away to illustrate the normally locked and unenergized state of the counter-rotating rotors.

As illustrated in FIGS. 1–4, wherein like numerals indicate like parts, the device of the invention has two main assemblies, a control assembly 10 and and a working or operating assembly 11.

The control assembly 10 is built upon a main body 12 of non-magnetizable material such as plastic, copper, stainless steel, or the like, having a stop or built up portion 13 on its upper surface for constraining the amount of rotation of first and second rotors 14 and 15, respectively. Rotors 14 and 15, of a magnetizable material such as soft iron, silicon steel, or the like, are each rotatably mounted upon body 12 by a bearing or shaft, the first rotor 14 pivoting on a first shaft 16 (FIGS. 1 and 2) and the second rotor 15 pivoting about a second shaft (not shown). The rotors 14 and 15 are not directly interconnected; consequently, forces applied to one rotor are not transferred directly from that rotor to the other. Additionally, although the rotors are shown as having a common plane of rotation, this is not an absolue requirement. One rotor may be mounted higher than the other or even with a plane of rotation at an angle with respect to that of the other. A means for biasing the rotors is provided to urge the rotors to the locked position illustrated in FIG. 1. Such biasing means may, for example, be a spring, such as spring 17 shown in FIG. 1. The spring is disposed between one portion of the rotor 14 and the built up portion 13 of main body 12 to urge counter clockwise rotation of the rotor 14. A similar spring (not shown) is disposed between a portion of the rotor 15 and the built up portion 13 to urge clockwise rotation of the rotor 15.

Figure 2:
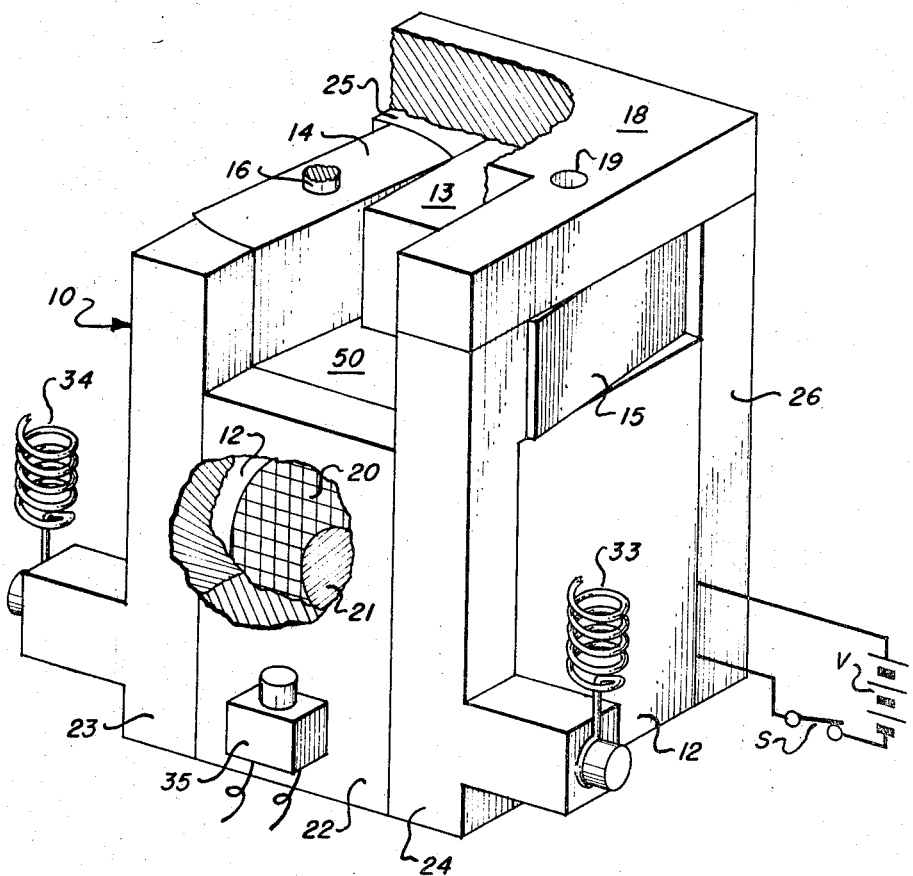
FIG. 2 is a front perspective view of a portion of the device of FIG. 1 which has been partially cut away, illustrating the unlocked and energized state of the counter-rotating rotors.

Covering the main body 12 and the rotors 14 and 15 is a non-magnetizable cover plate 18. The cover plate 18 constrains any linear travel of the rotors 14 and 15, and may have holes, such as hole 19 formed therein to accommodate the rotor bearing shafts to facilitate rotational movement of rotors 14 and 15. As seen in FIGS. 1 and 2, the cover plate 18 and main body 12 form a generally "U" shape, as viewed from the top, having a cavity 50 to accommodate the working assembly 11, as described below in detail.

Transversely contained within the main body 12 is a flux generating coil 20, which, in turn, contains a flux generator core 21 (illustrated in cut away portion of FIG. 1). The flux generator core 21 may be of any magnetizable material, such as soft iron or the like. The flux generating coil 20, of any electrically conductive wire, is connected by a switching means, S, to a means for activating the coil, such as a D-C potential, V.

To guide and deliver the magnetic flux generated by the flux generating coil 20 and the flux generating core 21, a unitary magnetizable element or a plurality of magnetizable flux distributing elements may be mounted on the front and rear of the control assembly 10. In the embodiment shown, the magnetizable elements on the front may include a flux transfer plate 22 which delivers magnetic flux to rotator attracting elements 23 and 24. A similar arrangement of magnetizable elements may be disposed in the rear of control assembly, only the attracting elements 25 and 26 being visible in the figures. Each of the attracting elements 23–26 may be cut at an angle with respect to the attracted face of its respective rotor to provide a greater flux transfer path and reluctance gap between the rotor and the attracting element, and to aid the built up portion 13 of main body 12 to constrain the amount of rotation of the rotors.

Figure 3:
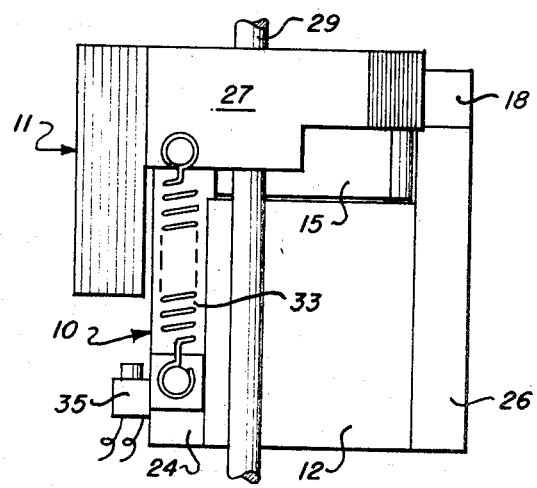
FIG. 3 is a side view of the device of the invention illustrating the device in the normally locked and unenergized state.

The working assembly 11 comprises a single body 27 slidably mounted on at least one guide rod or other appropriate restraining means mounted aside, on, or adjacent to the control assembly 10, guide rods 28 and 29 being illustrated for convenience. The body 27 may be formed into any appropriate shape, such as the illustrated "E" shape having a center protrusion 30 interdigitating into the front cavity 50 of the control assembly 10 to rest upon the upper surfaces of rotors 14 and 15, which when in the locked position as illustrated in FIGS. 1 and 3 impede any downward progress of body 27. The side portions 31 and 32 of the body 27 may also contact the upper surfaces of the rotors 14 and 15 where they project beyond on the outside of control body 10. Thus, the body 27 causes the rotors to be under compressive forces within the cavity 50 and in under shear forces where they protrude along outside of body 10, thereby increasing the resistive strength presented against the downward movement of working assembly 11. The body 27 is preferably of a non-magnetizable material so that it will not interact with or be influenced by the magnetic fields produced by the flux generating coil 20 and core 21. Means are provided for biasing the body 27 illustrated as springs 33 and 34 in FIGS. 1, 3 and 4 interconnecting the control assembly 10 and the working body 27. Such springs or biasing means rather than being directly connected between the control and working assemblies may, for example, be disposed to work against a case within which the entire device may be mounted, or some other member representing a common inertial ground to the working assembly 11 and control body 10. If the device is being used as a shifting mechanism to move the working assembly 11 downwardly to close a switch or perform some other function, springs 33 and 34 will normally be in tension urging the working assembly in the direction of the rotors 14 and 15. When the flux generating coil 20 is unenergized (switch S open) and the rotors are in their locked position, as illustrated in FIGS. 1 and 3, the protrusion 30 of working body 27 rests and is urged by springs 33 and 34 against the top surfaces of rotors 14 and 15, but, the motion of body 27 is impeded by the rotors. When the flux generating coil 20 is energized by closing switch S to apply voltage V (FIGS. 2 and 4), the magnetic field generated by coil 20 within core 21 travels through the flux transfer plate 22, divides to travel through attracting elements 23 and 24, travels about, within, and through rotors 14 and 15, through attracting elements 25 and 26, joins at the rear flux transfer plate (not shown) and reenters core 21. Since each rotor tends to align with the field between its respective attracting elements to achieve a low reluctance flux path, the rotors are moved to an unlocked position. Because of the action of springs 33 and 34, the working body 27 is forced downwardly into the cavity of control assembly 10. For illustration, in FIGS. 3 and 4, body 27 is shown activating a switch 35 mounted upon control body 10. As mentioned above, activating a switch is but one of the many uses for which the device can be used, and its introduction here is not intended as limiting the invention to the illustrated use.

If the device is being used as an inertial sensing device, the springs 33 and 34 may be normally in a compressed state to bias the body 27, in an upwardly direction. The mass of body 27 would then be forced downwardly by its inertia resisting an upward acceleration, and if a sufficient upward acceleration were applied, the body 27 would travel the distance to actuate switch 35.

The control body 10 acts as a safing device, the counter-rotating rotors 14 and 15 preventing any acceleration, vibrations or other forces from causing the body 27 to actuate the switch 35. When the flux generating coil 20 is energized and rotors 14 and 15 are moved, the body 27 may be free to be forced downwardly to actuate the switch 35.

The particular acceleration which will cause the body 27 to travel the distance required to actuate switch 35 depends upon the force exerted upwardly by springs 33 and 34, and the mass of body 27. In an ideal case, the force required to overcome a spring is proportional to the distance the spring is to be compressed, and likewise, the force exerted by a mass in resisting an acceleration is equal to the product of the mass and the acceleration. Once the acceleration creates a force which, with the mass of body 27, exceeds the force required to overcome the springs 33 and 34 over the distance $d$, illustrated in FIG. 4, the switch will be activated. To be understood, however, is that because even after the safing device of an inertial switch is unlocked the sensing mass may be exposed to vibrations and instantaneous variations in acceleration which may be of sufficient instantaneous magnitude to cause the mass to actuate the switch, commonly in such devices as escapement mechanism is attached to the sensing mass to average the accelerations and to ensure that only a sustained acceleration activate the device. Such escapement mechanisms, being well known in the art, are not illustrated herein.

Because of its particular construction, the device of the invention will remain in the unenergized, locked condition under extreme and severe environments. For example, if a rotational torque were applied to the device in the plane of rotation of rotors 14 and 15, the device would not unlock because of the counter-rotating action of the rotors. Although under such rotational force, one rotor may be free to rotate, the other would tend to rotate in an opposite direction, which would be locked by the built up portion 13 of main body 12. Additionally, any force applied to the body 27 will be evenly distributed upon the rotors, not acting to cause them to unlock.

Although the invention is illustrated with two counter-rotating rotors, more than two rotors may be employed with each pair of rotors stacked upon the other having the same or different actuating solenoids, thus providing, for example, a device which has a working body positionable between three or more vertical positions rather than the two positions illustrated.

Figure 4:
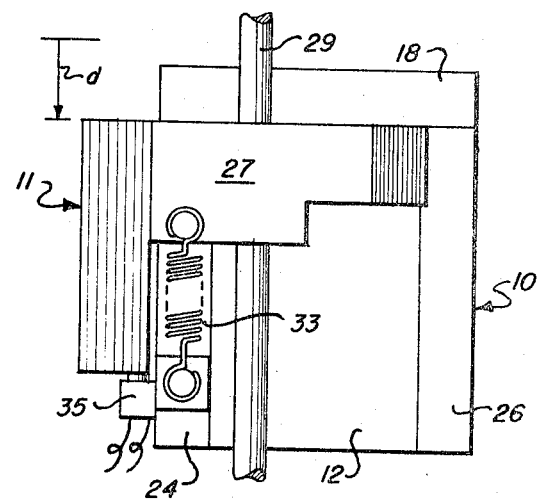
FIG. 4 is a side view of the device of the invention illustrating the operation of the device in the unlocked and energized state.

Additionally, the device as illustrated requires the flux generating coil to be constantly energized to maintain the rotors 14 and 15 in the unlocked position illustrated in FIGS. 2 and 4. To be understood is that in some applications wherein it is desirable that the rotors remain in an unlocked position without constant energization of flux generating coil 20, for example, if only a single voltage pulse is available to be applied to coil 20, a locking bar or other device may be advantageously utilized to hold the rotors in the unlocked position. Thus, although the invention has been described and illustrated with certain degree of particularity, to be understood is that the present invention is made only by way of example and that numerous other changes in the details of construction, combination, arrangement, and shape of parts may be resorted to without departing from the spirit and scope of the invention.

What is claimed is:
1. An actuating device comprising a supporting body; an operating member movable with respect to said supporting body; at least two rotatable members carried by said body, said rotatable members being operable independently of each other and having retaining portions movable between a position adjacent each other and said operating member and a position apart from each other and said operating member for normally simultaneously retaining said operating member; and means adjacent said rotatable member for simultaneously rotating said rotatable members in opposite directions with respect to each other to move the retaining portions from one of said positions to the other to free said operating member.

2. The actuating device of claim 1 wherein said means for simultaneously rotating said at least two rotatable members is a magnetic field generator which creates a magnetic field about and within said members and causes them to rotate.

3. The actuating device of claim 2 wherein said magnetic field generator is a flux generating coil carried by said supporting body, a flux carrying core contained within said core, and means distributing said magnetic field from said coil and core to the areas about and within said at least two rotatable members.

4. The actuating device of claim 1 further comprising means connecting said at least two rotatable members and said supporting body for biasing said rotatable members in said position adjacent each other.

5. The actuating device of claim 4 wherein said biasing means are springs.

6. The actuating device of claim 1 further comprising means disposed adjacent said supporting body for carrying said operating member.

7. The actuating device of claim 6 wherein said means carrying said operating member is at least one guide rod mounted aside said supporting body.

8. The actuating device of claim 7 further comprising biasing means adjacent said operating member for urging said operating member in the direction of said rotatable members interconnecting said operating body with a point at a common inertial ground with respect to said supporting body, whereby when said at least two rotors are moved to said positon away from each other, said biasing means moves said operating member in the direction of said rotors.

9. The actuating device of claim 8 wherein said biasing means for urging said operating member is at least one spring.

10. The actuating device of claim 7 further comprising biasing means for urging said operating member in the opposite direction from said rotatable members interconnecting said operating body with a point at a common inertial ground with respect to said supporting body, whereby when said rotors are moved to said position away from each other and an acceleration is applied to said operating member of magnitude sufficient to cause the force created by operating member resisting said acceleration to exceed the force of said biasing means, said operating member is moved between said rotors.

11. The actuating device of claim 10 wherein said biasing means for urging said operating member is at least one spring.

References Cited
UNITED STATES PATENTS

| 3,039,027 | 6/1962  | Cuches        | 335—265 |
| 3,152,290 | 10/1964 | Cassano et al.| 335—272 |
| 3,421,125 | 1/1969  | Sandoval      | 335—253 |
| 3,158,796 | 11/1964 | Musgrave      | 335—253 |

HAROLD BROOME, Primary Examiner

U.S. Cl. X.R.

335—277